Sept. 8, 1942.    C. C. GREEN    2,295,078
AUTOMATIC PRESS STOP
Filed Aug. 2, 1940    6 Sheets-Sheet 1

Inventor
CLARENCE C. GREEN
by Walter E. Kaufman
Attorney

Sept. 8, 1942.  C. C. GREEN  2,295,078
AUTOMATIC PRESS STOP
Filed Aug. 2, 1940  6 Sheets-Sheet 2
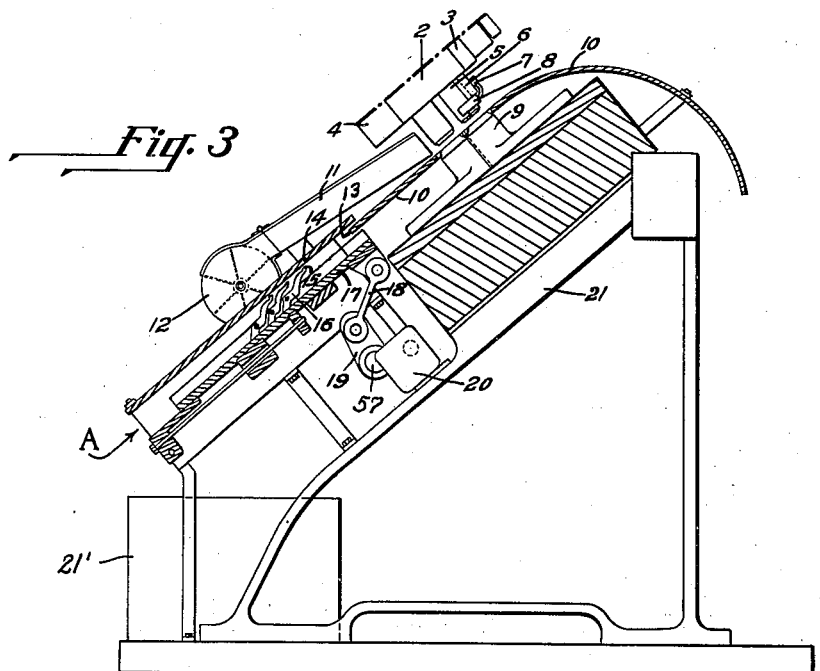
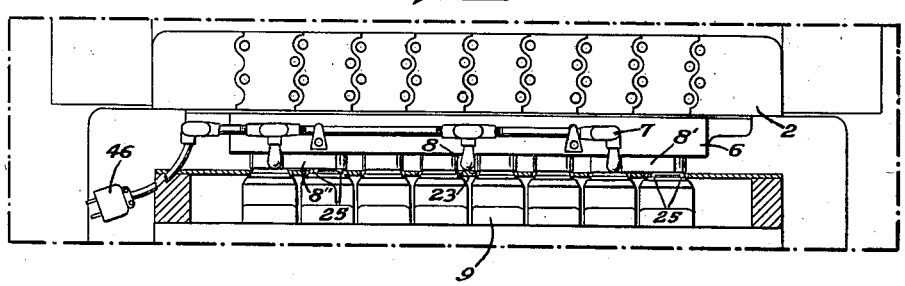
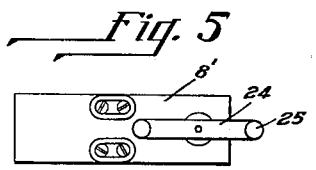
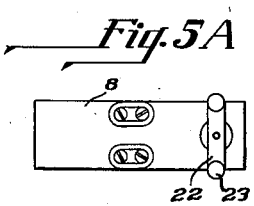
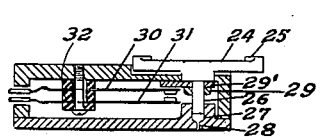
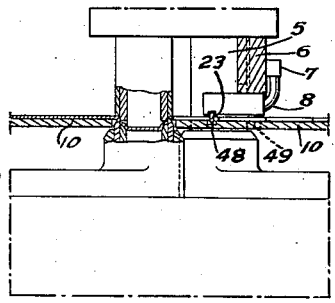
Inventor
CLARENCE C. GREEN
by Walter F. Kaufman
Attorney Sept. 8, 1942.　　　C. C. GREEN　　　2,295,078
AUTOMATIC PRESS STOP
Filed Aug. 2, 1940　　　6 Sheets-Sheet 3
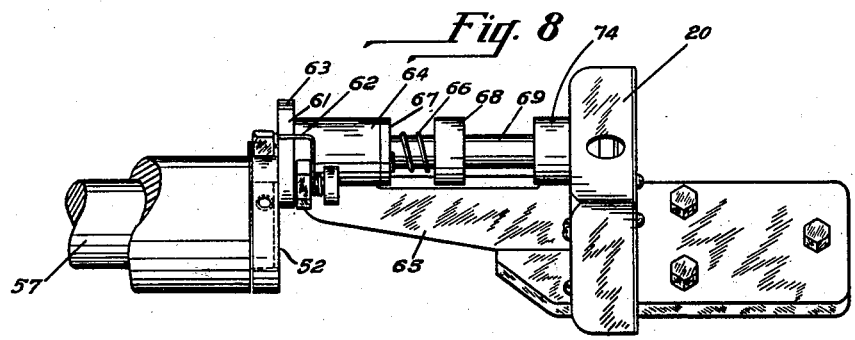
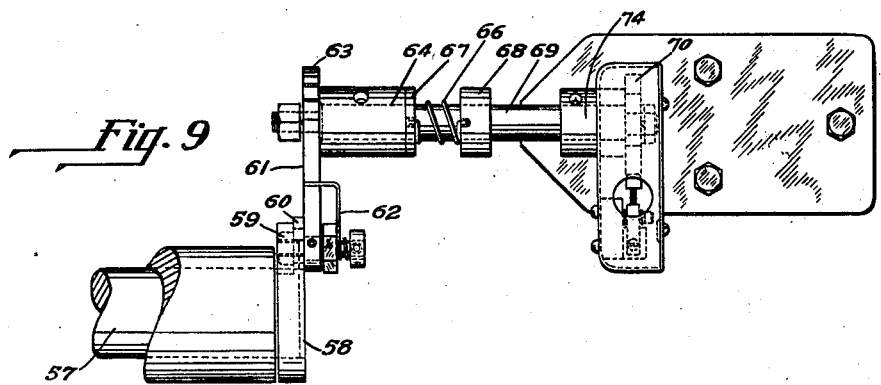
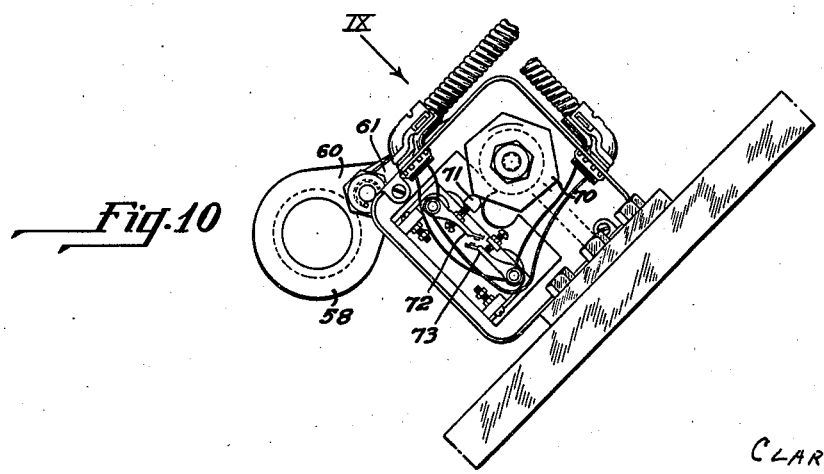
Inventor
CLARENCE C. GREEN
by Walter F. Kaufman
Attorney Sept. 8, 1942.  C. C. GREEN  2,295,078
AUTOMATIC PRESS STOP
Filed Aug. 2, 1940  6 Sheets-Sheet 4

Inventor
CLARENCE C. GREEN
by Walter F. Kaufman
Attorney

Sept. 8, 1942. C. C. GREEN 2,295,078
AUTOMATIC PRESS STOP
Filed Aug. 2, 1940 6 Sheets-Sheet 5
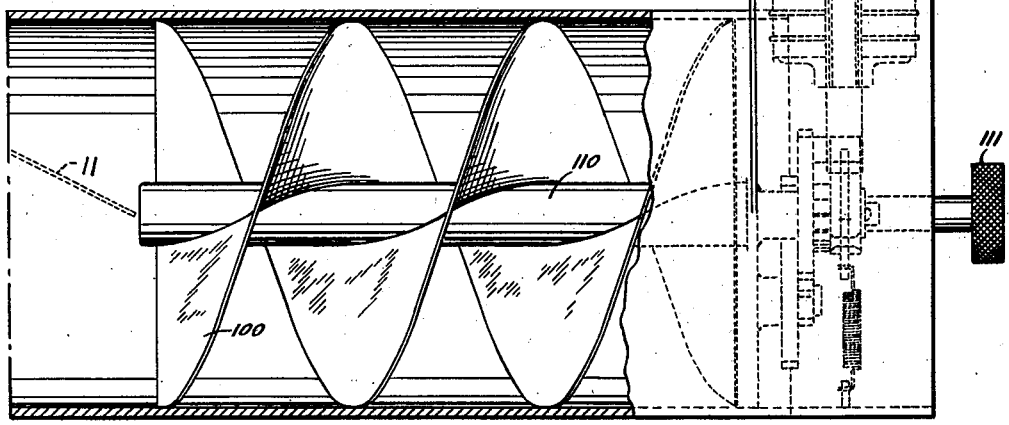
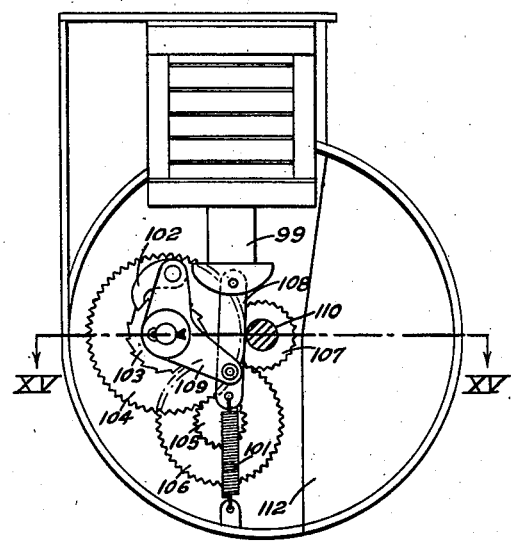
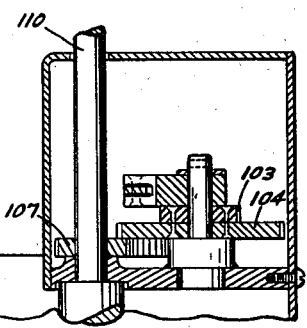
Inventor
CLARENCE C. GREEN
by Walter F. Kaufman
Attorney Sept. 8, 1942.   C. C. GREEN   2,295,078
AUTOMATIC PRESS STOP
Filed Aug. 2, 1940   6 Sheets-Sheet 6
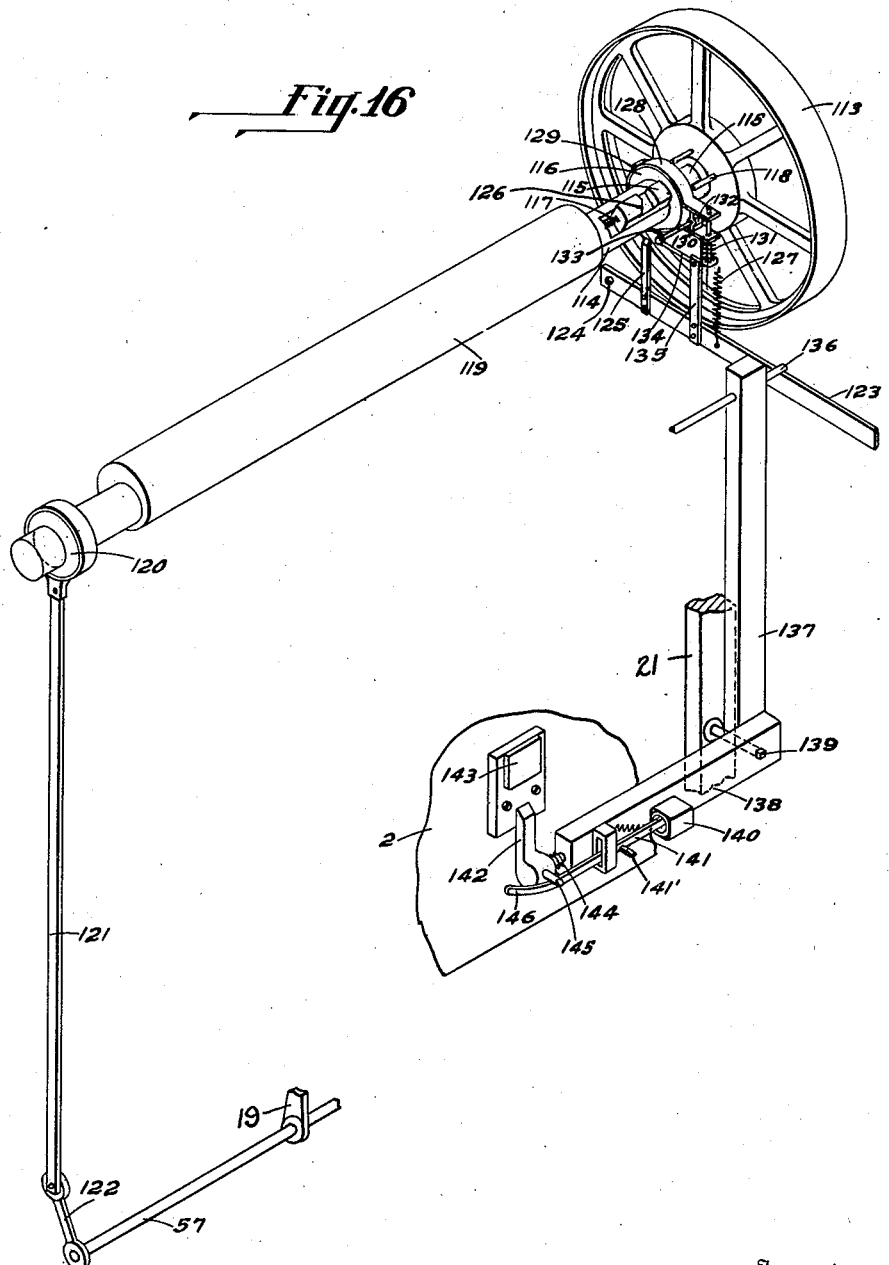
Inventor
CLARENCE C. GREEN
by Walter F. Kaufman
Attorney Patented Sept. 8, 1942

2,295,078

UNITED STATES PATENT OFFICE 2,295,078

AUTOMATIC PRESS STOP

Clarence C. Green, Manheim Township, Lancaster County, Pa., assignor to Armstrong Cork Company, Lancaster, Pa., a corporation of Pennsylvania Application August 2, 1940, Serial No. 349,601

20 Claims. (Cl. 164—88)

This invention relates to an automatic means for stopping the die press used in punching out and shaping lithographed articles, such as bottle caps, when the lithographed plate operated upon is out of register.

An object of the invention is to provide means for automatically stopping the press when the lithographed or unlithographed plate is out of register with the press mechanism.

A further object of the invention is to provide means for holding defective caps separate from the main body of good ones whenever defective caps are formed.

A further object of the invention is to provide such means upon a known machine with slight modifications thereof.

While the drawings illustrate a particular type of press, the invention may be applied to other types with slight modification of parts. An example of an inclined press with an ejecting device to which the invention is applicable is disclosed in U. S. Patent No. 1,945,992 to Boblett et al. In the drawings, illustrative of the invention:

Figure 1 is a diagrammatic sketch of the electric circuit utilized by the invention;

Figures 2a, 2b, and 2c are diagrammatic plan views of the arrangement of the apron and the relation of machine punches with the lithographed plate in various positions with respect thereto;

Figure 3 is a diagrammatic elevation of one of the presses partly in section;

Figure 4 is an enlarged view of a portion of one of the presses showing the switch mounting;

Figure 5 is a plan view of one of the feeler switches inverted;

Figure 11:
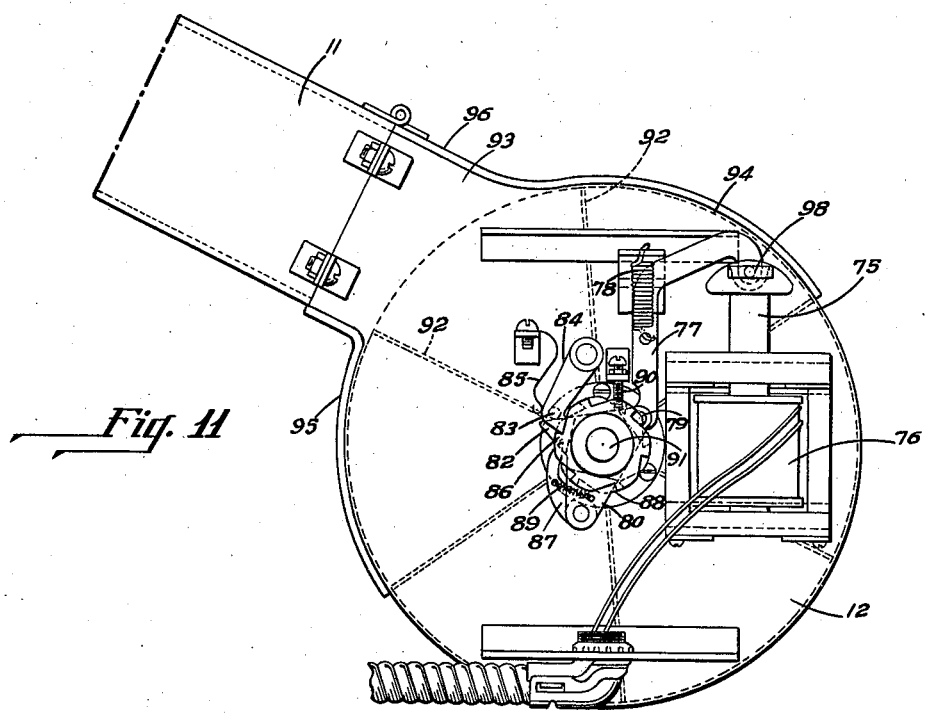
Figure 12:
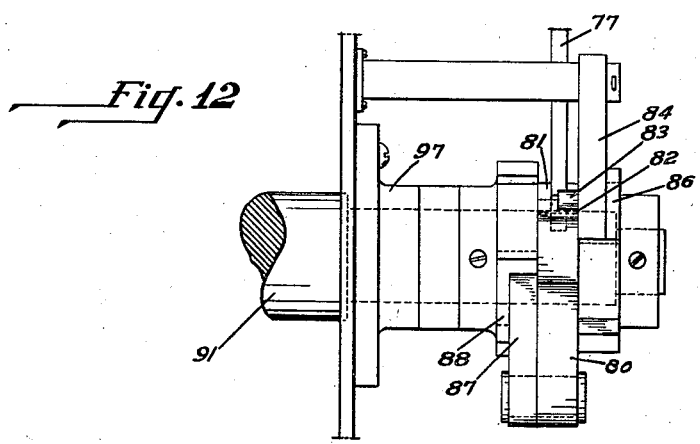

Figure 5—A is a plan view of another of the feeler switches inverted;

Figure 6 is a cross sectional view of the feeler switch of Figure 5 inverted;

Figure 7 is an enlarged view of a portion of Figure 3 partially in section, showing the relation of a feeler switch to the apron;

Figure 8 is a side elevational view of a relay switch connected to the rocker bar of the sheet feeding means;

Figure 9 is a view of the relay switch connected to the rocker bar looking in the direction of arrow IX in Figure 10;

Figure 10 is an end elevational view of the relay switch with the cover removed;

Figure 11 is an elevational view of the means for delivering the caps from the machine;

Figure 12 is an enlarged view of a detail of Figure 11;

Figure 13 is a modification of the cap delivery means partly in section;

Figure 14 is an end view of the modified delivery means with the cover removed;

Figure 15 is a cross sectional view of part of the mechanism associated with the modified delivery means taken on line XV in Figure 14; and Figure 16 is a skeleton view illustrating the operative connections of the press.

Figure 3 of the drawings show a press for punching out and shaping decorated metal bottle caps from a thin sheet upon which a multiplicity of decorations have been lithographed. The metal sheet is fed into the machine by a conventional chain conveyor (not shown) in the direction of the arrow A and is slid under the cover plate 14 and over the tips 15 of a plurality of feed fingers 16, of which only three are shown in the drawings. These fingers 16 are positioned along the length of a pair of finger bars 17 which are reciprocated by means of link 18 connected to the rocker arm 19, operated as described hereinafter. The fingers 16 have a stroke corresponding to the distance between successive fingers, and the lowermost pair strike the trailing end of the sheet after it leaves the chain at A. Each successive stroke of the finger bars 17 with the fingers 16 thereon results in an advance of the sheet by the distance of the stroke, the trailing end of the sheet being pushed by the tips 15 of one pair of the fingers on each forward stroke, and being caught by the next pair of fingers after the next reverse stroke. Since there are two parallel rows of these fingers, they ordinarily advance the sheet evenly through the opening 13 beneath the cover plate 14 and above the apron 10, which apron maintains the sheet in proper vertical position for punching and has clearance openings for the dies 9 which permit the punches 5 to act directly on the sheet. During the return motion of the finger bars 17 while the metal sheet remains stationary due to some conventional one-way holding means (not shown), the head 2 containing the punches 5 reciprocates in the guides 3 and 4 of the machine. The motions of the head 2 and the finger bars 17 are so correlated that the head 2 with its punches moves through its cutting stroke while the sheet is stationary, and the fingers move the sheet forward only after the punches have been freed from the sheet. The machine has two rows of punches indicated in the Figures 2a, 2b, and 2c by the shaded circles 44 and 45, the punches in each row being offset relative to those of the other in order to save on material and to simplify the construction of the machine. The skeleton of the metal sheet left after the caps have been blanked or punched out continues to move over the apron 10 to a container for scrap metal, while the caps are ejected from the punches by a conventional spring-actuated ejector button (not shown) within die 9 and fall into chutes 11, one of which is positioned on each side of the machine and has an entrant opening adjacent to and extending half way across the rows of punches. These chutes direct the caps into suitable containers 21' or to any suitable conveying means to transport them to the next scene of operation.

Any one of a number of things may happen to cause the lithographed sheet to be out of register with the punches. For example, the fingers 16 may bend the end of the sheet, or one of the fingers may miss the sheet, or the sheet may over-travel because of an oily layer on the surface, or it may be wavy, or it may buckle, or its sides may not be parallel so that it shifts from one side to the other, or the fingers may stick or jam. In order to stop the press whenever the lithographed sheet is out of register with the punches, the arrangement hereinafter described is applied to the machine.

Figure 1:
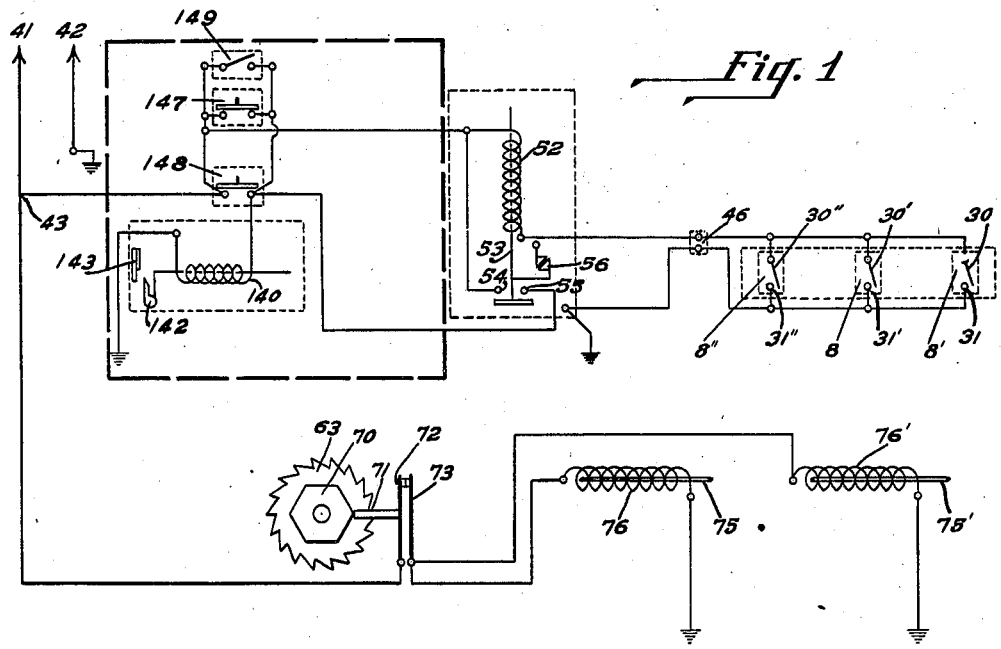

A cross bar 6, recessed to conform with one side of the punches 5, is attached under the head 2 adjacent one row of the punches as shown in Figures 3, 4 and 7. This bar 6 carries three switches 8, 8' and 8'', located as shown in Figure 4, and an electrical conduit 7 is provided on the bar 6 to provide the connection 46, shown in Figure 4 and at the right of the diagram in Figure 1. Two of the switches 8' and 8'', are attached at opposite ends of the bar lengthwise thereof, as shown in Figure 4, while the third switch 8 extends transverse of the bar as shown in Figures 1, 4 and 7. Each of the end switches 8' and 8'' as shown in Figure 5, has a feeler comprising a bar 24 having tips 25 while the central switch 8 as shown in Figure 5A has the corresponding elements 22 and 23 respectively. The interior of the switch is shown in more detail in Figure 6. As shown in that figure, the feeler bar operates in a recess in the switch casing and has a plunger 26 extending into a bore 27 in the opposite wall of the casing. This bore has a small aperture 28 which controls the rate with which the air is forced out of the bore 27 upon actuation of the feeler bar 24 and thereby produces a cushioning effect on the action of the switch and prevents binding of plunger 26. A collar 29 holds the switch contact actuating member 29' made of insulating material against a shoulder on the bar 24. Pressure on the tips 25 cause member 29 to close the switch contacts 30 and 31 supported by suitable insulating means at 32. The three switches 8, 8' and 8'' are attached to bar 6 with their feelers extending downwardly. The spacing of the feeler bar is described below in conjunction with Figures 2a, 2b, and 2c.

Figure 2A:
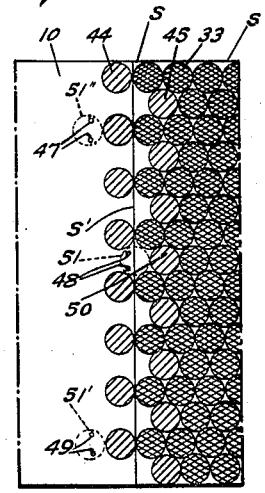
Figure 2B:
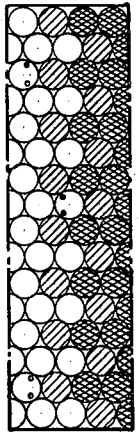
Figure 2C:
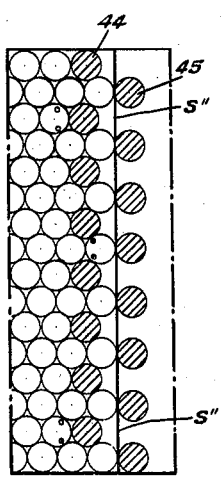

Figure 2a shows a plan view of the apron 10 with pairs of recesses therein 47, 48 and 49 corresponding in size, shape, and arrangement with the tips of the feeler bars of the switches. This figure also shows the metal sheet carrying the lithographed areas 33 in the position where the first punching of full sized caps from any given sheet occurs. The arrangement of the two rows of punches is indicated by the shaded circles 44 and 45. The switches 8, 8' and 8'' are so located on the press head that the tips of switch feeler bars 22 and 24 enter the pairs of recesses 47, 48 and 49 in apron 10 (see Figure 7) upon each downward stroke of the punches. After the first punching operation, the sheet is moved forward by a pair of the fingers 16 to a position such that the opening 50 previously punched out of the sheet by one of the punches 45 is in alignment with the dotted circle 51. It will be observed that if the sheet S has not moved out of register, the tips 23 of the feeler bar 22 of switch 8 will enter the pair of recesses 48 through this opening, whereas if the sheet is thrown to one side or the other or is not advanced the full distance of a stroke, part of the sheet surrounding the opening 50 will overlap one or the other or both of the pair of recesses 48 and this will cause the feeler tips 23, upon contacting the overlapping parts of the skeleton of the sheet, to close contacts 30, 31 of switch 8 which causes the machine to stop as will be hereinafter described. The pair of recesses 48 are located away from the center of the dotted circle 51 so that they are not covered by the unblanked leading edge S' of sheet S when in the position shown in Figure 2a. Similarly, the pairs of recesses 47 and 49 are located at opposite sides of the center of the dotted circles 51'' and 51' so that the trailing edge S'' of the sheet as shown in Figure 2c does not cover these recesses as the sheet leaves the punches and is ejected from the machine. Figure 2b shows the sheet S in a more advanced stage, the portions of the sheet S already punched out being shown as blank circles. The placing of two of the switches 8' and 8'' at opposite ends of the punching head increases the sensitivity, since if the plate merely pivots about the center, the central switch 8 might not operate. The arrangement of the feelers is such that at least one switch operates when the sheet is out of register. The three switches 8, 8' and 8'' have their spring contacts 30, 31; 30', 31'; 30'', 31'' in parallel so that operation of any switch will have the same effect.

The next portion of the machine to be described is the mechanism for holding those caps which are defective separate from the main body of caps already delivered from the machine. The rocker arm 19 hereinabove referred to in conjunction with Figure 3 is keyed to shaft 57 (Figures 8 to 10) so that oscillation of the shaft is associated with oscillation of arm 19. To one end of the shaft 57 there is fastened a cap 58 having a projecting portion 60 with a substantially radial slot therein for adjustment. A pawl 61 is bolted through the slot in the projection 60. By loosening the nut 59 the bolt may be positioned at any point radial of the shaft 57 thereby permitting variation of the stroke to which the pawl 61 travels upon each oscillation of the shaft 57. The end of the pawl 61 is biased into contact with ratchet 63 by means of a spring 62. This ratchet 63 is fastened upon a rotatable shaft 69 supported in bearings 64 and 74 and carrying fixed at the other end thereof an hexagonal cam 70. The stroke of the pawl 61 may be adjusted so that any number of strokes may be required to impart a complete rotation to the ratchet 63. Preferably, for reasons that will be explained hereinafter, the stroke of pawl 61 is so adjusted that eighteen strokes are necessary to rotate the ratchet 63 once so that three strokes will be required to rotate the cam 70 from one high point to the next in contact with follower 71. Each contact of the follower 71 with a high point of the cam 70 closes the switch 72, 73 which is connected in parallel with two solenoid coils 76 and 76' (Figure 1), one of these coils 76 being on a bucket gate 12 on one side of the machine while the other is upon a corresponding bucket gate on the other side of the machine.

A bucket gate is illustrated in Figures 11 and 12. As shown there, the chute 11, has fastened to its lower end upon opposite sides thereof two plate 93 which have a circular shape and are connected together by means of the plate 95. The top part of chute 11 at its lower end has hinged thereto a cover plate 96 which curves in conformity with the circular outline of the two plates 93. As shown in Figure 11, the fixed gate 95 and the hinged cover plate 96 extend only around the upper portions of the peripheries of the side plates 93 so that the bucket device is open at the bottom. The bucket gate itself comprises two circular plates 94 joined by six partitions 92, and is fixed to the spindle 91 rotatably mounted in bearings 97 in the plates 93. The spindle 91 extends outside one of the plates 93 and carries fixed thereto the ratchets 88 and 86 which are operated by the plunger 75 of the solenoid 76 in the manner hereinafter described.

Rotatably mounted between ratchets 88 and 86 upon the shaft 91 is a roughly triangular member 80 bifurcated at 81 to receive link 77 pivotally at 79, the link 77 being pivoted at its other end to the plunger 75 at 98 and being held in the upward position by the spring 78 except when pulled downward by the plunger 75. Adjacent the bifurcated point 81 of member 80 there is a stop 90 which limits counterclockwise movement of member 80. This member 80 has a small triangular point 82 having a flat surface against which pin 83 upon pawl 84 rests. A second pawl 87 is pivoted at the lower part of element 80 and is pressed by spring 89 against the ratchet 88. Figures 11 and 12 show the device at rest position. When at rest, as shown in the figures, there is a certain space between the tooth of pawl 87 and the face of the next tooth of the ratchet 88 to be engaged so that upon clockwise motion of member 80 (resulting from actuation of plunger 75 of the solenoid 76) the projection 82 lifts pin 83 and pawl 84 out of engagement with ratchet 86 prior to the engagement of pawl 87 with ratchet 88, which allows further clockwise rotation of the buckets during the completion of the stroke. The volume of each bucket between the partitions 92 is large enough to hold stampings from three strokes of the press, in other words, forty-eight caps. In the usual operation of the machine, the bucket gate rotates one-sixth of a revolution for each three punches, and as the buckets tip downwardly they pour the caps into a receptacle 21' (see Figure 3) or conveyor since the device is open at the bottom. Whenever the machine is stopped by the automatic device hereinafter described, it is only necessary to lift the cover 96 upon its hinges and remove those stampings which are spoiled by virtue of the fact that the lithographed plate moved out of register, such spoiled caps being limited to one or two of the uppermost buckets.

Figures 13 to 15 illustrate a modified form of means for segregating the spoiled caps, the device being in the form of a screw conveyor. The end of chute 11 on the machine extends down to the left end of the device shown in Figure 13 so that the caps fall into the path of the screw 100. For operating the screw 100, the solenoid of plunger 99 is connected in the circuit in place of solenoid 76 in Figure 1. The flow of current causes the plunger to move upward against the spring 101 which causes the pawl 102 to drive the ratchet 103 and gear 104 counterclockwise. The motion of gear 104 causes pinion 105 and gear 106 fixed to it upon a common axis to rotate, and, in turn, gear 106 turns pinion 107 which is fixed to the shaft 110 carrying the screw conveyor. Return of the plunger to the lowermost position causes the pawl to slide back over the ratchet 103 without motion of that ratchet. In this case, when it is necessary to remove spoiled caps, it is merely necessary to rotate the knob 111 fixed on the shaft 110 in a counterclockwise direction, the caps coming out of the device through the opening 112.

The operative connections of the press are illustrated in skeleton form in Figure 16 wherein the flywheel 113 is driven by a motor not shown. The rotation of the flywheel is transferred to the shaft 114 by means of clutch block 115 slidably mounted in a way cut in the shaft 114 and the clutch collar 116, the block 115 being normally urged by a spring 117 into engagement with one of several pins 118 in the flywheel 113 as shown. The shaft 114 has an eccentric 119 for driving the punch head 2 with a reciprocatory motion and an eccentric 120 which, through linkage 121, 122, imparts oscillatory motion to the shaft 57 suitably supported in stationary bearings and upon which the rocker arm 19 for feeding fingers and the pawl 61 for the cap delivery means are mounted as hereinbefore described.

The machine is provided with a hand lever 123 pivoted on a stationary part of the frame at 124. This lever has rigidly fixed to it a rod 125 adapted to engage a cam slot 126 on clutch block 115 to disengage the clutch. The spring 127 having one end fastened to the lever 123 and the other fastened to the stationary frame of the machine normally urges the rod 125 upwardly to disengage the clutch. Brake bands 128 are supported upon a pivot 129 fixed upon the frame of the machine. The ears 130 of the brake bands 128 are urged toward each other by spring 131. The ears 130 are spread by the double-eared wedge 132 whenever the clutch is engaged and they are urged to braking position by the spring 131 whenever the clutch is disengaged as will appear hereinafter. The wedge 132 is rotated with shaft 133 by the lever 134 and link 135 whenever the hand lever 123 is operated. The machine may be started by depressing lever 123 so that it is caught beneath the projection 136. The depressing of lever 123 removes rod 125 from clutch block 115, so that the block slides into engagement with one of the pins 118, and also rotates wedge 132 so that the brake is released from the clutch collar 116. The projection 136 is fastened to a rigid L-shaped lever 137, 138 which is pivoted to a stationary part 21 of the machine at 139. The arm 138 carries a solenoid 140 and plunger 141. The plunger 141 is urged out of the solenoid 140 by a spring to a limiting position controlled by the stop 141'. In the end of arm 138, the finger 142 is pivoted in alignment with the abutment 143 on the punch head 2, but it is urged away from the abutment by a spring 144 so that a pin 145 in the finger, rests upon the solenoid plunger 141. The end of the solenoid plunger is curved upwardly at 146 so that retraction of the plunger 141 into the coil 140 causes the finger 142 to move toward the path of the abutment 143 on the head. Thereupon, when the head 2 moves downwardly, the abutment 143 strikes th finger 142 and swings the L-shaped lever 137, 138 together with its projection 136 about the pivot 139 in a counterclockwise direction as viewed from the right in Figure 16. This motion of projection 136 allows spring 127 to pull lever 123 upwardly thereby causing rod 125 to disengage the clutch and causing link 135 to turn the wedge 132 so that its ears are in a horizontal position thereby permitting the brake to be applied whereup the machine comes to a stop.

As shown in Figure 1, the coil 140 is connected in parallel with a hand switch 147 in front of the machine, a hand switch 148 in back of the machine, and a switch 149 which is automatically closed whenever two sheets are fed to the machine. Operation of switch 149 may be effected by any conventional feeling mechanism. One such mechanism is disclosed in Leland Patent 1,916,845. The closing of any of these switches stops the machine. In addition, the closing of any one of the feeler switches, 8, 8' or 8" energizes coil 52 which retracts the plunger 53 closing the circuit through 54 and 55 in parallel with the switches 147, 148 and 149, so that coil 140 is energized and ultimately causes the machine to stop as described in the preceding paragraph.

Since the closing of a feeler switch is momentary and occurs at the time that the punch head 2 is at the lower limit of its motion, abutment 143 is alongside the finger 142 and can therefore not throw out clutch until the succeeding stroke. Upon the upward movement of the punch head 2, the feeler switch opens. However, to prevent reopening of circuit 54, 55 at this stage, a mechanical latch 56 is provided which holds this circuit closed so that the plunger 141 is still in retracted position when the head 2 again moves downwardly and so that finger 142 is struck by the abutment 143 on this stroke and the machine is stopped. For this reason, two defective stampings are ordinarily produced before the machine is stopped. If the sheet is out of register at the time the first punching occurs, this cannot be detected until the second punching stroke, as is made clear by reference to Figure 2, (I) and the earlier description thereof. Consequently under these circumstances, three punching strokes will occur before the machine is stopped, and it is for this reason that it is preferred to so construct the buckets of the bucket gate 12 that each bucket has capacity for three stampings and to adjust the pawl 61 so that three strokes are necessary to rotate the hexagonal cam 70 from one high point to the next in contact with the follower 71. Before the machine can again be started, the mechanical latch 56 must be freed by hand.

While the invention has disclosed solenoids operated by the cam 70 (Figure 10) for controlling the motion of the bucket gate, it is obvious that other suitable means may be used. For example, a flexible cable may have one end in place of the follower 71, the cam surfaces of the cam 70 being modified to get the proper displacement, and the other end of the cable may be substituted for the solenoids 75 or 99 respectively. Levers, ratchets and cams can also be substituted for the operation of gate. Instead of the pairs of recesses 47, 48 and 49 (Figures 2 and 7), perforations extending through the apron 10 may be employed. While the feeling elements have been shown as circular tips 23 and 25 on the bars 22 and 24 of switches 8, 8' and 8", the feeling elements may take other shapes. For example, the feeling elements may extend the full length of the bars 22 and 24 or they may be in the form of half circles to clear the blanked openings in the sheet and to clear the unblanked leading and trailing edges of the sheet just as and for the same reason the form of switches shown in the drawings have been designed to do. Obviously, the recesses or perforations in the apron should correspond in size, shape and arrangement with the feeler elements. By making the switches accurately and sensitive to a very small displacement, the recesses in the apron may be omitted, and reliance may be placed entirely upon the thickness of the sheet being operated upon.

In the claims, the expression "died out" is to be construed to include the result of the operation both of forming and of cutting. Also, the expression "out of register" is to be construed to include generically the situation in which an undecorated sheet or the piece of material operated upon is out of alignment with the press mechanism as well as the situation in which the decorated areas of a sheet are out of alignment or out of register with the press mechanism.

While I have illustrated and described certain specific preferred embodiments of my invention, it will be understood that the invention is not limited to the form shown and described but may be otherwise embodied and practiced within the scope of the following claims.

I claim:

1. In a device of the character described, the combination of punch and die means, means for feeding stepwise past said first-mentioned means a sheet decorated with a multiplicity of areas to be died out, automatic means for stopping both said means whenever the decorated areas to be died out are out of register with said die means, and means for holding a portion of the products resulting from the operation of said first-mentioned means separate from the main body of such products.

2. In a device of the character described, the combination of die means, means for feeding stepwise past said die means a sheet decorated with a multiplicity of areas to be died out, punch means, means for reciprocating said punch means into cooperative relationship with said die means, automatic means for stopping all said above-mentioned means whenever the decorated areas to be died out are out of register with said punch and die means, and means for holding the punched articles died out from said sheet while said sheet is out of register with said die means separate from the main body of punched articles.

3. In a device of the character described, the combination of a means for guiding a sheet bearing a multiplicity of decorated areas past a die means, punch means carrying feeler means, said feeler means being located on the scrap side of said punch means and arranged to be operated when said sheet is out of alignment, means for reciprocating said punch means, said first-mentioned means comprising a member recessed at areas corresponding in arrangement with said feeler means, means operated by said feeler means for stopping said guiding means and said reciprocating means.

4. In a device of the character described, the combination of a means for guiding a sheet bearing a multiplicity of decorated areas past a die means, means for intermittently delivering the died articles from said machine in small substantially equal portions, punch means carrying feeler means, said feeler means being located on the scrap side of said punch means and arranged to be operated when said sheet is out of alignment, means for reciprocating said punch means, said first-mentioned means comprising a member recessed at areas corresponding in arrangement with said feeler means, and means operated by said feeler means for stopping said guiding means, said reciprocating means, and said delivering means.

5. In a device of the character described, the combination of a die means, a plate surrounding said die means for guiding a sheet bearing a multiplicity of decorated areas past said die means, punch means, means for reciprocating said punch means, feeler means located on said punch means adjacent the scrap side of said punch means, said feeler means comprising a bar having a length slightly less than the distance across the previously punched opening in said sheet at the location of said feeler bar when said sheet is in register, said bar having a projection thereon, said plate being recessed to correspond with said feeler bar to permit the projection on said bar to enter said recess without contacting said plate when said sheet is in register, means operated by the contacting of said bar upon the sheet when out of register for stopping said punching means.

6. In a device of the character described, the combination of die means, means for feeding in stepwise movement a decorated sheet past said die means, punch means corresponding to said die means, means for reciprocating said punch means, an apron for guiding said sheet past said die means, said punch means carrying a plurality of spaced feeler elements, each of said elements being so arranged as to just clear internally the periphery of a previously punched opening when said sheet is in register, recesses in said apron corresponding in size and arrangement to said elements, rotatable means for delivering the products from said device, cam means operated by said feeding means for intermittently operating electromagnetic means for rotating said delivery means.

7. In a device of the character described, die means, means for feeding a decorated sheet past said die means, punch means cooperating with said die means, and means operated by said feeding means for delivering the punched products intermittently in small portions from said device.

8. In a device of the character described, die means, means for feeding a decorated sheet past said die means, punch means cooperating with said die means, means operated by said feeding means for delivering the punched products intermittently in small portions from said device, means for stopping all of said means, and hand means for removing that portion of the punched products remaining in the delivery means when the feeding means is stopped.

9. In a device of the character described, die means, means for feeding a decorated sheet past said die means, punch means cooperating with said die means, means operated by said feeding means for delivering the punched products intermittently in small portions from said device, means for stopping all of said means and hand means for removing that portion of the punched products remaining in the delivery means when the feeding means is stopped, said delivery means comprising a bucket wheel rotatable on a horizontal axis, open at the bottom, and having a removable cover.

10. In a device of the character described, die means, means for feeding a decorated sheet past said die means, punch means cooperating with said die means, and means operated by said feeding means for delivering the punched products intermittently in small portions from said device, means for stopping said device and hand means for operating said delivery means to remove that portion of the punched products remaining in the delivery means when the feeding means is stopped.

11. In a device of the character described, die means, means for feeding a decorated sheet past said die means, punch means cooperating with said die means, and means operated by said feeding means for delivering the punched products intermittently in small portions from said device, means for stopping said device, said delivery means comprising a screw conveyor, and a ratchet means for permitting hand operation of said conveyor to remove that portion of the punched products remaining in the delivery means when the feeding means is stopped.

12. In a device of the character described, a feeler switch comprising a reciprocable feeler element having a switch actuating member and a plunger, said plunger being mounted in one end of a bore, said bore having a small opening in the other end, and resilient switch contacts in the path of said actuating member.

13. In a device of the character described, the combination of punch and die means, means for feeding stepwise past said first-mentioned means a piece of material to be formed, automatic means for stopping both said means whenever the material to be died out is out of register with said die means, and means for holding the most-recently formed portions of the products resulting from the operation of said first-mentioned means separate from the main body of such products.

14. In a device of the character described, the combination of punch and die means, means for feeding stepwise past said first-mentioned means a sheet to be died out, feeler means having at least three contact members substantially in a common plane at least one of which lies outside of a straight line including at least two other contact members, and that at least two of said members lie adjacent to the periphery on the opposite sides of the center of at least one previously punched opening in said sheet, and means operated by any of said contact members for automatically stopping the punch and die means and the feeding means whenever the sheet to be died out is out of register with said punch and die means.

15. In a device of the character described, the combination of punch and die means, means for feeding stepwise past said first-mentioned means a sheet to be died out, feeler means having at least three contact members substantially in a common plane, said contact members being so arranged that each of said members just clears interiorly the periphery of a previously punched opening when said sheet is in register and being so arranged that at least one of the said members lies outside of a straight line including at least two of the other members and that at least two of said members are situated on opposite sides of the center of at least one previously punched opening in said sheet, and means operated by the contacting of said feeler with said sheet whenever the sheet to be died out is out of register with said punch and die means for automatically stopping both the punch and die means and the feeding means.

16. In a device of the character described, the combination of punch and die means, means for feeding stepwise past said first-mentioned means a sheet to be died out, feeler means having at least three contact members substantially in a common plane so arranged that at least two of said members are situated on the same side of the center of at least one previously punched opening in said sheet and arranged so as to just clear internally the periphery thereof when said sheet is in register and that at least one other of said contact members lies on the opposite side of the center of a previously punched opening in said sheet so as to just clear internally the periphery of said opening when said sheet is in register, and means operated by said feeler means for automatically stopping said punch and die means and said feeding means whenever contacting of said sheet by said contact members is caused by lack of register of said sheet.

17. In a device of the character described, the combination of punch and die means, means for feeding stepwise past said first-mentioned means a sheet to be died out, a feeler means having at least three contact members, so arranged that each of at least two of said members are situated on the same side respectively of each of two previously punched openings with a contacting element of one of said members situated so as to just clear internally one side of the periphery of the opening to which it is adjacent while at least one contacting element of said other member is so arranged as to be adjacent and to just clear internally the opposite side of the periphery of the other opening when said sheet is in register, said feeler means having at least one contacting member situated on the opposite side of the center of a third previously punched opening so as to just clear internally the periphery thereof when said sheet is in register, and means operated by the contacting of any of said elements with said sheet resulting from lack of register of said sheet for stopping both said punch and die means and said feeding means.

18. In a device of the character described, the combination of punch and die means, means for feeding a piece of material past said first-mentioned means, means for intermittently delivering the died articles from said machine in small substantially equal portions, and automatic means for stopping said punch and die means, said feeding means, and said delivering means whenever the piece of material to be died out is out of register with said punch and die means.

19. In a device of the character described, the combination of punch and die means, means for feeding a piece of material to be died out past said first-mentioned means, automatic means for stopping said punch and die means and said feeding means whenever the piece of material to be died out is out of register with said punch and die means, and means for holding the punched articles died out from said sheet while said material is out of register with said punch and die means separate from the main body of punched articles.

20. In a device of the character described, punch and die means, means for feeding a piece of material to be died out past said first-mentioned means, said feeding means comprising a rocker shaft, rotatable means for delivering products from said device, electromagnetic means for rotating said rotatable means, a pawl secured on said rocker shaft, a switch arranged to be closed intermittently by the rocking of said pawl for actuating said electromagnetic means intermittently whereby the products from said device are delivered intermittently in small substantially equal portions.

CLARENCE C. GREEN.